Inventor
Andrew O. Siren

Patented June 20, 1950

2,512,039

UNITED STATES PATENT OFFICE 2,512,039

LOADING AND UNLOADING GRAIN ELEVATOR

Andrew O. Siren, Calgary, Alberta, Canada

Application October 10, 1947, Serial No. 779,122
In Canada October 12, 1946

3 Claims. (Cl. 214—83.26)

This invention relates to grain loading and unloading machines, and the objects of same are the provision of a davit-supported rectangular case containing power driven chain and cup elevating apparatus, and the machine is capable of rotative dispositions on two such davit members to a maximum extent, being centrally pivoted on a truck box or the like, the reach of the machine being variably adjustable to accommodate varying loading and unloading conditions.

An advantage in this invention is the ease with which the machine may be pivotally swung in a complete circle about the vertical axis of its supporting elements as well as about the horizontal axis of its davit-supported trunnions, such universal movements being further supplemented by the sliding action of the main case longitudinally in relation to its davit supports.

Further advantage is the adoption of a cup elevator within a rectangular case in place of conventional augers, since the pickup is considerably more efficient with this type, and there is less wear and tear than when the grain is churned about in a screw application.

This is a vertical lift elevator, and it is preferably driven by the power take-off of a tractor, the operational features including bevel and sprocket gears, though it may be pulley and belt driven. It is a portable machine for bolting to a truck box, or it may be suspended in a granary, or may be pivoted for use in any position for delivery horizontally or vertically.

With these objects and advantages in view this invention consists in the novel features of construction hereinafter described and claimed, and in the drawings accompanying this specification it must be observed that similar numerals refer to similar parts throughout the different views.

Figures 1, 2, 3, 4:
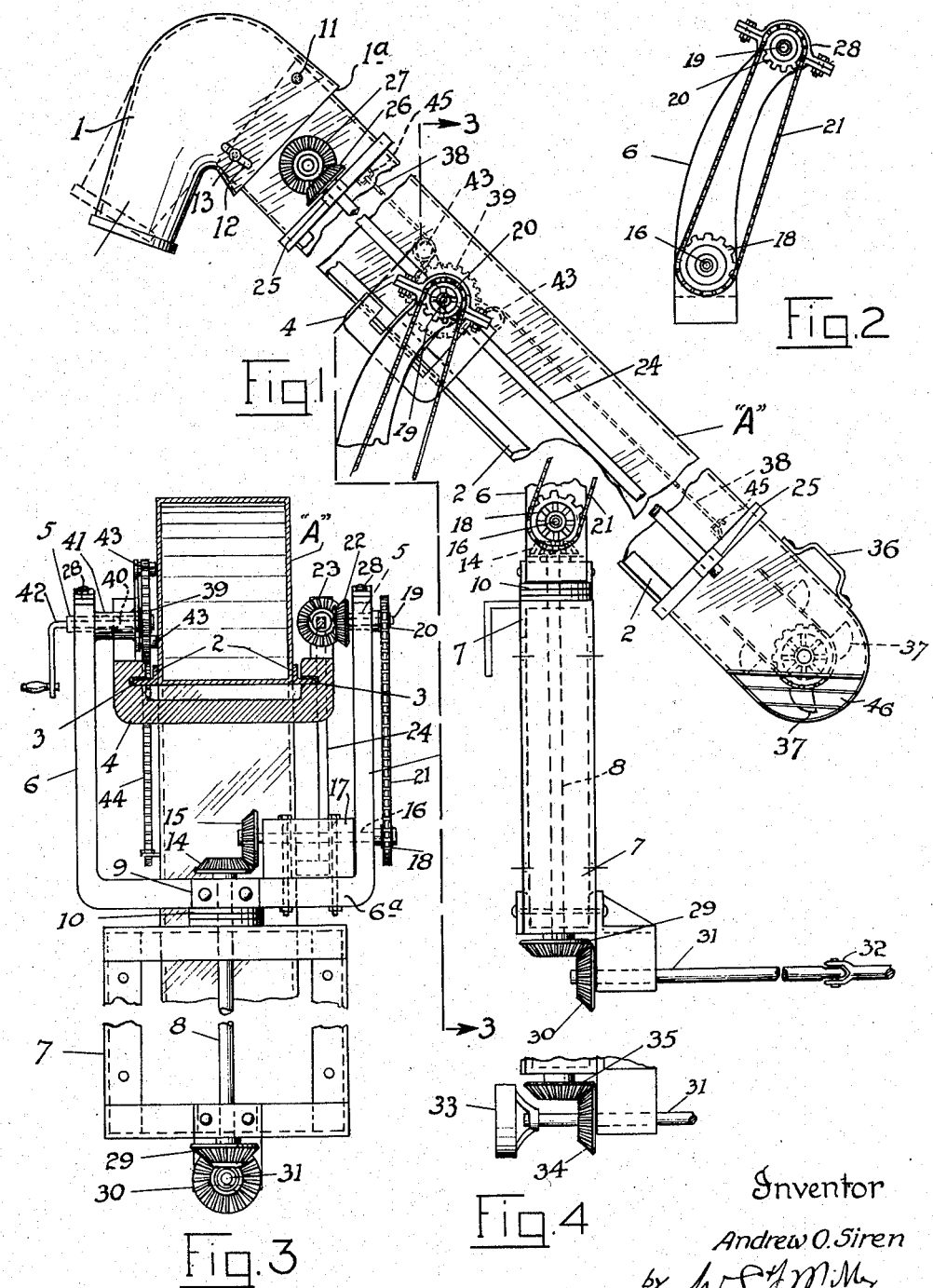
Fig. 1 is a side view in elevation of the loader and its supporting framework.
Fig. 2 is a detailed view of one of the davits for suspending the loader in a universal manner.
Fig. 3 is a cross sectional view on line 3—3 in Fig. 1.
Fig. 4 illustrates a suitable belt drive in place of the more usual power take-off means.

Referring to the drawings: A is a cup and chain type of elevator for grain and other produce or material, and it is equipped with a jointed pipe or chute 1 at its upper elevated delivery end. The elevator body or case is rectangular and is supported slidably by means of two angle irons, one at each bottom corner thereof, and these angle irons 2 are longitudinally slidable in grooves 3 in a U-shaped bracket member 4, the said grooves facing inwardly towards one another. This bracket 4 depends by means of trunnions 5 from another U-shaped frame 6, davit shaped as seen in Fig. 2 in respect to its two upright arms, and swivelly supported on a frame 7 by means of a central vertical shaft 8 within a bearing 9 in the base portion 6a of the frame 6. Wear plates 10 are inserted between the davit frame and its supporting frame 7 about the bearing 9.

The delivery chute 1 is flared out at its juncture end with the case A as at 1a, and a pivot pin 11 pivoting the case and chute together permits adjustment of the chute for directing the delivery. A slot 12 in the chute and a bolt 13 projecting from the case permits tightening and maintaining the chute in the desired direction.

To drive the elevating mechanism a bevel gear 14 is fitted to the top of the vertical shaft 8 and meshes with a bevel gear 15 on a horizontal shaft 16 supported bearably in a bearing 17 affixed to the base 6a. A sprocket 18 is fitted on the outboard end of shaft 16 to drive a short shaft 19 mounted bearably within one of the trunnions 5 on which shaft is a sprocket 20 connected by a chain 21 with said sprocket 18. On the other end of this shaft 19 is a bevel gear 22 meshing with a bevel gear 23 to drive a set of bevel gears and shafting for operating the elevating mechanism within the case A. The gear 23 is mounted on a shaft 24 mounted in bearing supporting blocks 25 strapped to the case A. A bevel gear 26 at the top end of this shaft 24 meshes with an elevator drive bevel gear 27 for driving the internal gears and mechanism. This shaft 24 is square in cross section in order that the case A may slide longitudinally relative thereto.

Trunnion bearings 28 are fitted to the top ends of the davits 5. The vertical shaft 8 is driven by a bevel gear 29 fitted thereto, said gear being meshed with a bevel gear 30 directly fitted to a power take-off shaft 31, which shaft is driven by conventional power take-off means. A belt pulley is also fitted on to this shaft 31 in place of the power take-off connection 32 if so desired.

Besides being longitudinally extendable within its bracket 4 the case A is rotatable on the vertical shaft 8, and is also swingable in a vertical arc on its supporting trunnions 5.

The belt drive as shown in Fig. 4 comprises a pulley 33 mounted on the shaft 31 to drive same in place of the power take-off means. This driven shaft 31 has a bevel gear 34 thereon meshing with a bevel gear 35 mounted on the shaft 8 in place of the bevel gear 29. Special bracketing arrangements are provided for these shafts 8 and 31 to carry the necessary shaft bearings, all as seen in Figs. 1 and 4.

A handle 36 is conveniently placed at the lower end of the case A for manipulation of the elevator in all directions. Cup elevating means as at 37 are employed to raise the grain being connected at intervals along an elevator chain 38.

A chain and sprocket system is used to slide the case A longitudinally in the guides 3. This system comprises a sprocket 39 mounted on a spindle 40 running bearably through the trunnion 5 on the opposite side to the trunnion through which the elevator drive shaft bears. A bearing block 41 for this spindle is aligned with this trunnion, projecting inwardly from this side arm of the bracket 6. A crank 42 is attached to the outwardly projecting end of the spindle 40 to turn the sprocket. The block 41 is so shaped as to support two rollers 43, one adjacent to each side of the sprocket, over which rollers a chain 44 passes in engagement partly encircling the sprocket. The extreme ends of this chain are anchored to the case A as shown at 45. Thus on turning the crank the chain pulls the elevator case longitudinally one way or the other as the angle irons 2 slide in the grooves 3.

An opening in the underneath of the bottom end of the case A at 46 is for the pickup intake of grain into the elevator.

I claim, and desire to secure by Letters Patent the following:

1. Loading and unloading apparatus comprising in combination an elevator case with elevating power driven cups and chain therein, a bracket frame depending from trunnions for the tiltable support of said case, slide members mounted in grooves in the base portion of said bracket to slidably support the case, a U-frame with davit shaped arms bearably supporting said trunnions at the top ends of said arms, these arms being so bent to allow for vertical tilt of the case, an under frame swivelingly supporting said U-frame, a square elevator drive shaft at one side of the case journaled in bearings affixed thereto, a bevel gear on said square shaft at the head end of the case to mesh with a bevel gear on the elevator chain driving shaft, a bevel gear with a square hub bearing slidably on said square shaft to allow the square shaft to slide longitudinally therethrough, a bevel gear meshing perpendicularly with said slide-providing bevel gear and mounted on a short shaft bearably passing through one of said trunnions, a sprocket on said short shaft, and a chain for driving said sprocket by means of a drive sprocket itself driven by a bevel gear on a horizontal power driven shaft, said bevel gear meshing with a vertical-mounted bevel gear power driven directly by a perpendicularly aligned meshing bevel gear.

2. A mobile elevator for loading and unloading, comprising an elevator case longitudinally slidable with respect to its trunnion supported underslung bracket, and tiltable with respect to its pivotal trunnion supports, and swingable in a horizontal plane with respect to its fixed base supports, comprising parallel guide angle irons to bearably and slidably support said case, grooved portions of the case-supporting bracket accommodating the said angle irons slidable therein, a swivel frame with davit arms uprightly supporting said case-supporting bracket by means of trunnions forming parts of the bracket, a square shaft for driving the elevating apparatus through a bevel gear slidable on the shaft, and a system of bevel gears, sprockets and a chain with shafts to drive said bevel gear from any suitable source of power.

3. All as in claim 2, and adding a sprocket with a crank handle, and mounted bearably through one of said trunnions and having a bearing block integral therewith, a gear chain, and chain guide rollers mounted on said bearing block, the ends of the gear chain being anchored to the said case, all for the longitudinal extension and the retraction of the elevator case relative to its support.

ANDREW O. SIREN.

REFERENCES CITED

The following references are of record in the file of this patent:

UNITED STATES PATENTS

| Number | Name | Date |
|---|---|---|
| 1,841,525 | Evensen | Jan. 19, 1932 |
| 2,355,711 | Dolyniuk | Aug. 15, 1944 |
| 2,389,483 | Bobrowski et al. | Nov. 20, 1945 |
| 2,410,996 | Patterson | Nov. 12, 1946 |